May 3, 1966 E. H. GREEN Re. 26,012

AEROSOL VALVE HOUSING CONSTRUCTION
AND METHOD OF MAKING SAME
Original Filed March 20, 1962

INVENTOR.
EDWARD H. GREEN
BY
Silverman, Mullin + Cass
ATTY.

United States Patent Office

Re. 26,012
Reissued May 3, 1966

26,012
AEROSOL VALVE HOUSING CONSTRUCTION AND METHOD OF MAKING SAME

Edward H. Green, 11 Army Trail Road, Addison, Ill.

Original No. 3,159,318, dated Dec. 1, 1964, Ser. No. 180,957, Mar. 20, 1962. Application for reissue Apr. 20, 1965, Ser. No. 458,505
11 Claims. (Cl. 222—394)

Matter enclosed in heavy brackets [ ] appears in the original patent but forms no part of this reissue specification; matter printed in italics indicates the additions made by reissue.

This invention relates generally to the art of aerosol containers and more particularly, is concerned with improvements in the construction of an aerosol valve housing and a method of manufacturing the same.

As is well-known, the aerosol container used today comprises a canister or bottle designed to withstand substantial internal pressure while carrying a quantity of some material it is desired to dispense, such as, for example, insecticide, paint, starch, cosmetics, and the like. A quantity of some propellant is likewise included in the container, the propellant conventionally comprising a highly volatile liquid material, such as Freon. Most containers are intended to be used in an erect position, and hence, a valve mechanism is provided mounted to the top of the container and hermetically sealed thereto with an external valve release means, such as, for example, a push-button. The push-button carries a nozzle or atomizer, and it is intended that when the valve is released, the propellant will drive a quantity of material through the push-button and out through the nozzle. The valve being at the top of the container, although internally installed, is therefore interposed in a conduit which must dip into the container and have an opening adjacent to the bottom of the container. The container will be under such temperature normally that the propellant will be in a vapor phase at substantially super atmospheric pressure and above the liquid material in the container.

The valve mechanism normally is installed within a housing that is adapted to be secured to the top of the container. The dip tube preferably is a flexible member of soft synthetic plastic material, such as, for example, polyethylene, polyvinyl, polypropylene, or the like, while the valve housing may be formed from a more rigid synthetic plastic material. Also, the valve housing may be made from similar plastic materials as the dip tube where circumstances dictate using thicker and heavier gauges of such material such as will be sufficiently stiff to provide the desired results. As described herein, the valve housing is formed of a more rigid synthetic plastic, such as, for example, nylon, acetal resins, and the like. Of course, any of the plastic materials used will be compatible with the chemical compositions loaded in the canister, i.e., resistant to chemical reaction therewith.

Heretofore, the dip or siphon tube has been secured to the valve housing by several methods which can be classified generally as being one of two types. In one method where the housing is formed of sheet metal, the dip tube is inserted into the end of the housing and the metal is crimped or swaged around the dip tube, sealing the same. These dip tubes are somewhat pliable and hence, the crimping will hold them securely since there will be some cold flow of the plastic material so that the crimped ridge or projection will sink somewhat into the surface of the dip tube. The second method is to provide the end of the housing with an opening having a ridge therein and forcing the end of the dip tube into said opening, relying upon the flexibility of the dip tube to enable the same to pass into the opening and relying upon the cold flow thereof to embed the ridge into the dip tube for holding the same securely.

Accordingly, the primary object of the invention is to provide a construction which lends itself to high speed assembly of the dip tube to the valve housing.

As is well-known, the valve manufacturer produces an assembly which includes the valve, valve housing, spray head, and dip tube all built into a cap or cover. It is in this form that the assembly is supplied to the packager who applies the assembly to its own containers. These assemblies, therefore, are handled, transported and stored between the time they are made and the time they are used, and it is essential that the dip tube remain in place.

Another object of the invention is to provide a construction in which the dip tube is assembled to the valve housing by a clamping structure which holds the same securely against pull-out.

A further object of the invention is to provide a valve housing structure in which assembly can be effected easily and with high speed.

Still a further object of the invention is to provide a simple, yet, effective construction for securing a dip tube to the valve housing in which provision is made for using a portion of the vapor phase within the canister to assist in atomization of the material being sprayed.

Important objects of the invention also are concerned with the methods for achieving the construction of the invention.

In connection with the object mentioned immediately above, it is pointed out that the several parts of the assembly above described are quite small and not readily handled manually. Furthermore, since the cost of the structure will be increased where there are pieces added it is desirable that the construction lend itself to being formed of as few fabricated parts as possible.

It is an important object of the invention to provide a construction for a valve housing in which two of the parts of the housing are fabricated together as an integral part, but when assembled, each provides its independent function, separate one from the other.

Many other objects of the invention and advantages derived therefrom will become apparent as the description thereof evolves hereinafter, in connection with which the valve housing will be described for use with a type of dispenser having one form of valve and atomizer. However, it is intended that the invention not be limited to this form, nor limited to the precise details of the remainder of the construction.

The drawing illustrates the preferred embodiment of the invention and is to be considered in the light of the particular description which follows.

The invention is characterized by providing a valve housing having a cylindrical portion adapted to be engaged with the upper end of a dip tube. The lower end of the cylindrical portion is provided with a constricted throat and the upper end of the dip tube is adapted to be engaged in the throat and held in place by a flexible clamping sleeve that is driven into the throat while the dip tube is disposed within the sleeve. The diameter of the sleeve normally is greater than the internal diameter of the throat so that as the clamping sleeve is pushed into the throat it will constrict about and securely hold the upper end of the dip tube.

The invention is further characterized by providing the clamping sleeve, where desirable, with an external groove capable of establishing communication between the interior of the valve housing and the upper portion of the container to which the assembly is adapted to be secured, thereby enabling a vapor phase to be transmitted to the valve mechanism simultaneously with the passage of the material and propellant through the dip tube.

Figure 1:
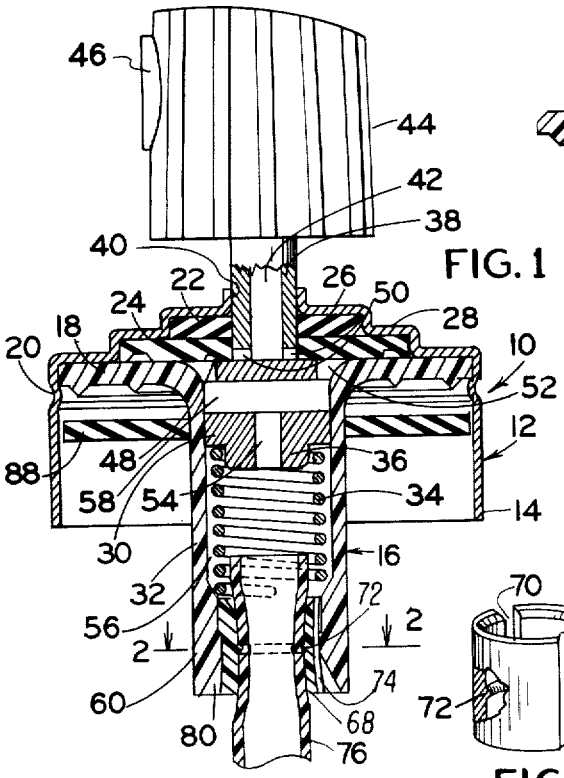
FIG. 1 is a median sectional view taken through an aerosol dispenser valve housing and valve mechanism constructed in accordance with the invention.

Referring now to FIG. 1, there is illustrated an assembly designated 10 which is sold in the form shown for attachment to the top of a container by a packager. The upper portion of the assembly 10 is of substantially little or no consequence insofar as the invention is concerned and may take many different forms. In that form shown, which is intended to be secured to a bottle, there is an outer metal cap 12 having a depending annular skirt 14 which is adapted to be crimped around the neck of a bottle and have the valve housing 16 secured therein. The bottom portion of the valve housing is of novel construction and will be described shortly, but the upper end thereof is more or less conventional. Said upper end includes an integral disc portion 18 which is crimped within the cap 12 by an annular deformation 20. One or more resilient gaskets 22 and 24 may be sandwiched between the disc portion 18 and the upper annular step formations 26 and 28 respectively formed in the cap 12.

The cap 12 normally is made of sheet metal while the valve housing 16, in this case, is of a rigid plastic material.

The valve is in the form of a plug 30 which is slidable within the cylindrical portion 32 of the valve housing 16 and is urged upwardly by a coil spring 34 disposed within the housing. The lower end of the spring 34 seats upon a structure which will be described while the upper end engages the valve seat 36 formed on the bottom of the plug 30. The upper end of said plug is provided with a hollow stem 38 that extends tightly through the gaskets 22 and 24 and out the opening 40 at the top of the cap 12. A passageway 42 in the center of the stem 38 communicates through suitable passageways in the finger piece 44 with a spray nozzle 46 through which the material stored in the canister is adapted to be atomized. In the particular construction, it is intended that the finger piece 44 will be removable but other structures are capable of being used such as, for example, those in which the finger piece 44 and stem 38 are integral and not connected to the valve body.

The upper portion of the plug 30 provides a shoulder 48 that engages against the bottom of the gasket 24 and is biased to this condition by the spring 34. At the bottom end of the passageway 42 are provided one or more lateral passageways 50 by means of which it is intended that the passageway 42 will communicate with the chamber 52 above the plug 30.

In the particular construction illustrated, which is not intended to be limiting, the plug 30 has a central axial passageway 54 which carries material from the mixing chamber 56 upward into a transverse passageway 58 and thence to the chamber 52.

When the user presses down on the push button 44, the shoulder 48 will be separated downwardly from the gasket 24, thereby establishing communication between the mixing chamber 56 and the central passageway 42 by way of the axial passageway 54, the transverse passageway 58 and the chamber 52. So long as the button is held in its downward position, the aerosol spray will be dispensed through the nozzle 46. When the user desires to discontinue the spray, he merely releases the button 44 and the spring 34 seats the valve plug 30 against the bottom of the gasket 24 to cut off the spray.

As thus far described, the operation of the valve is known. Many different forms of such construction and operation are capable of being built into the assembly 10 for use with the invention, the substance of which will be described hereinafter.

It will be seen that the cylindrical portion 32 of the valve housing 16 providing the chamber 56 is fairly thin, but at the bottom end of the cylindrical portion 32, there is a thickened portion 60 which forms a throat 62. The throat 62 may extend axially for the full dimension of the thickened portion 60 or, as shown, may be in two parts, 62 and 64. The part 64 is formed by virtue of a slight taper provided on the interior of the throat to give rise to a ridge 66. As will be seen hereinafter, a clamping sleeve is intended to be driven into the throat, and the presence of the ridge 66 assists in forcing the clamping sleeve to constrict. The taper formed in the portion 64 decreases toward the ridge 66 and forms a pilot for the clamping sleeve as it is driven into the throat 62.

Figure 3:
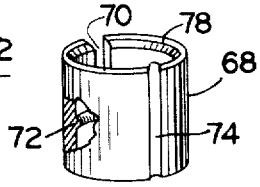
FIG. 3 is a perspective view of the resilient clamping sleeve for securing the dip tube in place within the valve housing of the assembly.
Figure 5:
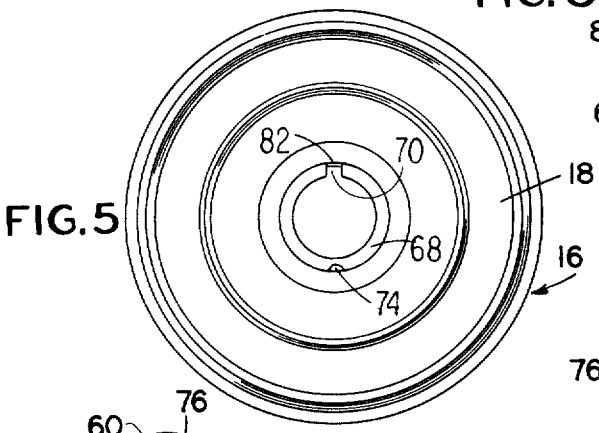
FIG. 5 is a bottom plan view of the valve housing of FIG. 4.

In FIG. 3, the clamping sleeve referred to is shown at 68. The sleeve has a diameter which is greater than the inside diameter of the throat 62 at the ridge 66. The sleeve has an axially extending split 70, the thickness of which is such that when the sleeve is driven home into the throat 62, the sleeve will constrict with the opposite sides of the split 70 abutted in tight engagement, thereby, in effect, providing a continuous sleeve.

On its interior, the sleeve is provided with a small ridge 72 that extends circumferentially about said interior. A small external groove 74 may be provided extending axially on the outside surface of the clamping sleeve 68. When the sleeve is installed within the throat 62, the dimension of the groove 74 will not materially change.

Referring now to FIG. 1, assuming that the valve housing 16 has been formed independently of the sleeve 68, in order to assemble a dip tube 76 to the housing 16, one inserts an end of the dip tube into the bottom of the housing. Since there is no sleeve 68 present at this time, it is a simple matter to feed the free end of the dip tube 76 into position. In prior structures which did not use a crimping technique, this could not easily be done because the throat end of the housing was required to be of a diameter sufficiently small to seize the end of the dip tube and hence, slightly smaller than the diameter of the dip tube. In such prior structures, therefore, where the housing 16 was formed of plastic material, it was necessary to force the tube into the lower end of the housing.

Continuing with the explanation of the manner of assembly, the sleeve 68, being substantially greater in diameter internally than the external diameter of the dip tube, is readily fed over the dip tube and moved to the bottom end of the cylindrical portion 32. The lead end of the sleeve 68 is chamfered internally as shown at 78 to enable the same to slide along the dip tube as the sleeve is installed. The said leading end 78 will engage the tapered entrance 80 of the valve housing 16, and as the sleeve is pushed into the throat, it will constrict about the dip tube closing the split 70 and clamping the dip tube within itself with the ridge 72 sinking into the dip tube.

In its final configuration, the sleeve 68 forms the bottom seat for the spring 34 which may be installed together with the other portions of the upper assembly after the dip tube has been clamped in place.

The ridge 66 tightly engages the sleeve 68 which, in turn, tightly engages the upper end of the dip tube 76 rendering the dip tube almost impossible to be separated from the assembly.

The importance of the structure is that it is susceptible of high speed, mechanical assembly. All of the parts go together loosely and easily, and the clamping operation permanently secures them together.

For effective clamping, obviously the split 70 must be closed with its opposite sides tightly abutting. If desired, by suitable contour, the split 70 may be closed, but an external groove may be provided to enable a vapor or gas phase above the liquid within the container to which the assembly 10 is to be secured to pass into the mixing chamber 56 so as to provide more efficient atomization. Otherwise, the external groove 74 will provide for passage of gas from the upper portion of the container through the throat 62 for the same purpose.

Although, as explained above, it is feasible for the sleeve 68 to be fabricated separately from the valve housing 16 and then assembled to the dip tube 76 in mechanical production, it is preferable to assemble the same in the manner to be described hereinafter.

Figure 4:
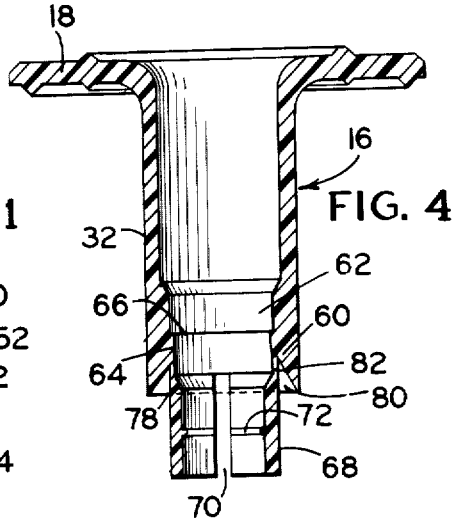
FIG. 4 is a median sectional view taken through the valve housing in FIG. 1 but showing the same in its fabricated condition prior to being associated with the valve assembly of FIG. 1.
Figure 6:
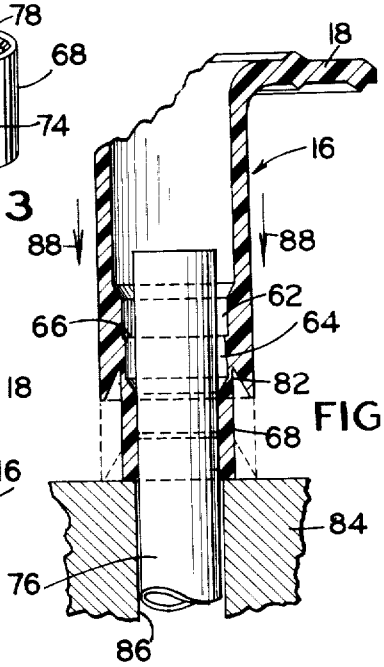
FIG. 6 is a view similar to that of FIG. 4 but showing the manner in which the dip tube is associated with the valve housing during assembly thereof.
Figure 2:
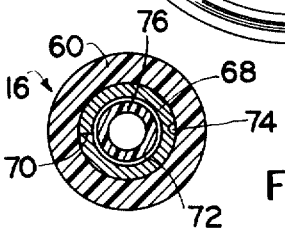
FIG. 2 is a sectional view taken along the line 2—2 of FIG. 1 and in the direction indicated.

The valve housing 16, as shown in FIGS. 4 and 6, preferably is molded with the collar or clamping sleeve 68 formed as an integral extension thereof. The construction of the sleeve 68 of FIG. 3 is identical to that of FIGS. 4 and 6 with the exception that there is a small integral, annular web 82 that connects the clamping sleeve 68 with the thickened portion 60 of the cylindrical part 32. This web 82 is located at the juncture of the throat portion 64 and the lead taper 80. Since the material from which the entire structure is molded is plastic, by making the web 82 quite thin, the same will be fringible.

In the formation of this assembly, the first thing that is done is to connect the valve housing 16 to the dip tube 76. By virtue of the formation of the valve housing 16 and the clamping sleeve or ring 68 as one integral member, this may be done in one operation. It is a simple matter to lead the section of dip tube 76 through the top of the valve housing 16, since everywhere along its movement, the diameters are much greater than those of the dip tube. To accomplish this, the article comprising the housing 16 and sleeve 68 is mounted on a suitable fixture or mandrel 84, as shown in FIG. 6, that is provided with an opening 86 within which the bottom end of the dip tube may be secured with the proper length thereof protruding. With the bottom end of the sleeve 68 in place upon the mandrel 84, mere application of pressure to the top of the valve housing 16 in the direction shown by the arrows 88 will break the web 82 thereby freeing the sleeve 68, but immediately driving the same into the throat 62 to clamp the upper end of the tube 76 as shown at FIG. 1.

It will be seen from the above disclosure that the construction which has been described and the method of achieving the same are both economical and highly effective for the purpose of clamping the dip tube 76 to the valve housing 16. It is not essential to the invention that the interior of the sleeve 68 be provided with the ridge 72 or that the ridge 66 be provided. In the actual construction of a commercial example, the ridge 72 was .002 of an inch high and the ridge 66 provided a taper at that point of only .003 of an inch on each side.

Many of the details of the construction are capable of being varied without in any way departing from the spirit and scope of the invention as defined in the claims which follow. For instance, the upper end of the valve housing 16 may have many different configurations and need not have those shown in the drawings. The ridges which are provided on the bottom of the disc 18 are intended to cooperate with the gasket shown at 88 when the assembly 10 is secured to the top of the bottle, but no limitations are intended by this arrangement.

What it is desired to secure by Letters Patent of the United States is:

1. An aerosol dispenser valve construction which comprises, a hollow valve housing having an entrance formed at one end thereof, a dip tube *having an* [adapted to have its] end *thereof rigidly* secured within said entrance, a clamping sleeve encircling said end frictionally [constrictively] to engage the same, and the said clamping sleeve being in turn frictionally secured telescopically within said entrance, *the sleeve and entrance end of the housing cooperating to clamp the sleeve around the tube in a reduced diameter annular constriction.*

2. A structure as claimed in claim 1 in which the clamping sleeve comprises a split member formed of resilient material the outer diameter of which normally is greater than the interior diameter of the entrance and the inner diameter of which is normally greater than the outer diameter of the end of the dip tube, and said clamping sleeve is disposed in said entrance in a constricted condition.

3. A structure as claimed in claim 2 in which the split of said clamping sleeve forms a gap and the said gap is closed when said sleeve is disposed within said entrance.

4. A structure as claimed in claim 1 in which said entrance has a guide taper for facilitating forcing of said sleeve into the same.

5. A structure as claimed in claim 1 in which said sleeve has an external groove providing a passageway between itself and said valve housing past said entrance.

6. A structure as claimed in claim 1 in which said clamping sleeve has an internal ridge formation depressed into said encircled end of the dip tube.

7. A structure as claimed in claim 1 in which said entrance is comprised of a pair of connected parts, one of said parts being convergently tapered inwardly toward the second part to form a riged juncture between said parts for frictionally engaging said dip tube.

8. In an aerosol dispenser valve construction which includes a hollow valve housing having an entrance formed at one end thereof, a dip tube joined to the housing in an otherwise sealed juncture with the internal bore of the dip tube communicating with the interior of the housing through said entrance, said dip tube being constricted circumferentially at said juncture, and auxiliary conduit means comprising an elongated groove formation between the outer circumferential wall of said dip tube and the inner circumferential wall of said valve housing to which said tube is joined, said groove formation cooperating between said dip tube and housing at said juncture to provide a passageway through said juncture into the housing in the general axial direction of said entrance to aid in atomization of the product to be dispersed.

*9. In an aerosol dispenser valve construction, a hollow valve housing having an entrance formed at one end thereof, a flexible dip tube having one end thereof secured within said entrance, a clamping sleeve encircling said end frictionally to engage the same, the clamping sleeve in turn being frictionally secured telescopically within said entrance, said sleeve and entrance end of the housing cooperating to constrict the sleeve about the tube thereby to effect an annular reduced diameter constrictive connection with the tube within the entrance.*

*10. In an aerosol dispenser valve construction, a hollow valve housing having an entrance formed at one end thereof, a flexible dip tube having its end installed secured within said entrance, a clamping sleeve of freely variable diameter encircling said end constrictively to engage the same, said clamping sleeve being in turn installed frictionally engaged within the said entrance, the inside diameter of the sleeve in installed condition being smaller than the outer diameter of the dip tube in non-installed condition.*

*11. In an aerosol dispenser valve construction which has a valve housing provided with an entrance at one end thereof and an end of a flexible dip tube is to be rigidly secured in said entrance; the improvement comprising, means for securing said end of the dip tube within said entrance comprising, said housing having a clamping sleeve integral with and severably connected to said housing spaced outwardly of said entrance, said sleeve having a freely variable diameter, the outer diameter*

*thereof ranging between a maximum value in connected condition greater than the inner diameter of the entrance to a minimum value in severed condition smaller than the outer diameter of the dip tube in non-installed condition, said sleeve adapted to receive said end of the dip tube inserted therethrough into the entrance prior to severing of said connection and the sleeve being severable with the dip tube so inserted frictionally to engage the sleeve interior of said entrance and constrictively to engage the dip tube within the entrance with the sleeve encircling the said end thereof.*

References Cited by the Examiner

The following references, cited by the Examiner, are of record in the patented file of this patent or the original patent.

UNITED STATES PATENTS

| | | | |
|---|---|---|---|
| 2,323,216 | 6/1943 | Goldschmidt | 29—416 |
| 2,324,162 | 7/1943 | Hubenet | 222—394 X |
| 2,391,582 | 12/1945 | Martin. | |
| 2,621,014 | 12/1952 | Efford | 251—353 |
| 2,645,387 | 7/1953 | Kahn | 222—464 X |
| 2,658,714 | 11/1953 | Fooshee | 251—353 |
| 2,738,107 | 3/1956 | Graham | 222—211 X |
| 2,757,964 | 8/1956 | Both et al. | 239—337 X |
| 2,822,608 | 2/1958 | Watson | 29—416 |
| 2,822,960 | 2/1958 | Lengel. | |
| 2,841,863 | 7/1958 | Geisler | 29—413 |
| 2,856,103 | 10/1958 | Ward. | |
| 2,858,602 | 11/1958 | Johnson | 29—413 |
| 2,861,723 | 11/1958 | Cooksley. | |
| 2,968,428 | 1/1961 | Samuel. | |
| 2,991,917 | 7/1961 | Ward. | |
| 2,995,278 | 8/1961 | Clapp. | |
| 3,037,276 | 6/1962 | Woods | 29—416 X |
| 3,088,682 | 5/1963 | Venus | 222—394 X |
| 3,095,127 | 6/1963 | Green | 239—573 X |

RAPHAEL M. LUPO, *Primary Examiner.*